United States Patent [19]

Shimatani et al.

[11] Patent Number: 4,720,120
[45] Date of Patent: Jan. 19, 1988

[54] WHEEL SUSPENSION FOR MOTOR VEHICLE

[75] Inventors: Hiroyuki Shimatani; Yasuhiro Morita; Hidesi Komamizu, all of Toyota, Japan

[73] Assignee: Toyota Jidosha Kabushiki Kaisha, Toyota, Japan

[21] Appl. No.: 25,623

[22] Filed: Mar. 13, 1987

[30] Foreign Application Priority Data

Mar. 13, 1986 [JP] Japan .............................. 61-36738[U]
Jan. 10, 1987 [JP] Japan ................................ 62-2063[U]

[51] Int. Cl.$^4$ ............................................. B60G 3/00
[52] U.S. Cl. .................................... 280/671; 280/716; 180/316; 267/292
[58] Field of Search .............. 280/716, 660, 671, 96.1; 180/316; 267/63 R

[56] References Cited

U.S. PATENT DOCUMENTS

| | | | |
|---|---|---|---|
| 3,161,419 | 12/1964 | Schaaf .................... | 280/96.1 |
| 3,913,696 | 10/1975 | Kennedy et al. ............ | 180/312 |
| 4,249,753 | 2/1981 | Froumajou ................. | 280/660 |
| 4,263,980 | 4/1987 | Harlow, Jr. et al. ........ | 180/312 |
| 4,639,006 | 1/1987 | Aikawa ..................... | 280/660 |

FOREIGN PATENT DOCUMENTS 59-169206 11/1984 Japan .

Primary Examiner—John J. Love
Assistant Examiner—Kenneth R. Rice
Attorney, Agent, or Firm—Oblon, Fisher, Spivak, McClelland & Maier

[57] ABSTRACT

In a wheel suspension for a motor vehicle which comprises a subframe arranged transversely to the longitudinal direction of the vehicle and having a pair of laterally spaced front end portions to be fastened to the vehicle chassis and a pair of laterally spaced rear end portions to be fastened to the vehicle chassis, and a pair of suspension arms each base portion of which has a front end articulated to the respective front end portions of the subframe and a rear end to be articulated to the respective rear end portions of the subframe, a pair of brackets each are preliminarily fastened at their base portions to the rear end portions of the subframe to support each rear end base portion of the suspension arms articulated thereto and fastened at their base portions to the vehicle chassis through the rear end portions of the subframe and at their end portions to the vehicle chassis.

3 Claims, 6 Drawing Figures

WHEEL SUSPENSION FOR MOTOR VEHICLE

BACKGROUND OF THE INVENTION

1. Field of the Invention

The present invention relates to a wheel suspension for motor vehicles, and more particularly to a mounting construction of suspension arms in the wheel suspension.

2. Description of the Prior Art

In a conventional mounting construction of suspension arms, a subframe is arranged transversely to the longitudinal direction of a vehicle and fastened to the vehicle chassis to support a pair of suspension arms each base portion of which is articulated at its front end to a front end of the subframe, and a pair of brackets are arranged at opposite sides of a rear portion of the subframe and fastened to the vehicle chassis to support the respective base portions of the suspension arms at their rear ends. In another conventional mounting construction of suspension arms, for example, as disclosed in Japanese Utility Model Early Publication No. 59-169206, a subframe is arranged transversely to the longintudinal direction of a vehicle and fastened to the vehicle chassis to support a pair of suspension arms each base portion of which is articulated at its front and rear ends to the subframe.

In the former convention mounting construction, each base portion of the suspension arms is articulated at its front end to the subframe and at its rear end to the vehicle chassis by means of the bracket independently from the subframe. In such an arrangement, precision in each articulated position of the suspension arms is greatly influenced by precision in fabrication and mounting of the subframe and is also influenced by precision in fabrication of the vehicle chassis. For this reason, it is difficult to enhance precision in each articulated position of the suspenion arms. Furthermore, it is required to enhance rigidity of the respective front ends of the subframe for attachment to the suspension arms so as to ensure sufficient support rigidity of the suspension arms. To satisfy such requirements, the subframe is, in general, reinforced by means of attachment plates secured thereto or increased in thickness. This results in an increase of weight and manufacturing cost of the subframe.

In the latter mounting construction, each base portion of the suspension arms is articulated at its front and rear ends to the subframe. It is, therefore, able to enhance precision in each articulated position of the suspension arms in a simple manner. It is, however, required to enhance rigidity of the subframe so as to ensure sufficient support rigidity of the suspension arms. This results in an increase of size, weight and manufacturing cost of the subframe.

SUMMARY OF THE INVENTION

It is, therefore, a primary object of the present invention to provide an improved wheel suspension wherein the suspension arms can be precisely positioned in place in a simple manner without causing any increase in weight and manufacturing cost of the subframe.

According to the present invention, the object is attained by providing a wheel suspension for a motor vehicle which comprises a subframe arranged transversely to the longitudinal direction of the vehicle and having a pair of laterally spaced front end portions to be fastened to the vehicle chassis and a pair of laterally spaced rear end portions to be fastened to the vehicle chassis, and a pair of suspension arms each base portion of which has a front end articulated to the respective front end portions of the subframe and a rear end to be articulated to the vehicle chassis. The wheel suspension is characterized in that a pair of brackets each are fastened at their base portions to the rear end portions of the subframe to support each rear end base portion of the suspension arms articulated thereto and that the brackets each are further fastened at their base portions to the vehicle chassis through the rear end portions of the subframe and at their other ends to the vehicle chassis.

BRIEF DESCRIPTION OF THE DRAWINGS

Additional objects, features and advantages of the present invention will be more readily appreciated from the following detailed description of a preferred embodiment thereof when considered with reference to the accompanying drawings, in which.

DESCRIPTION OF THE PREFERRED EMBODIMENT

Figure 1:
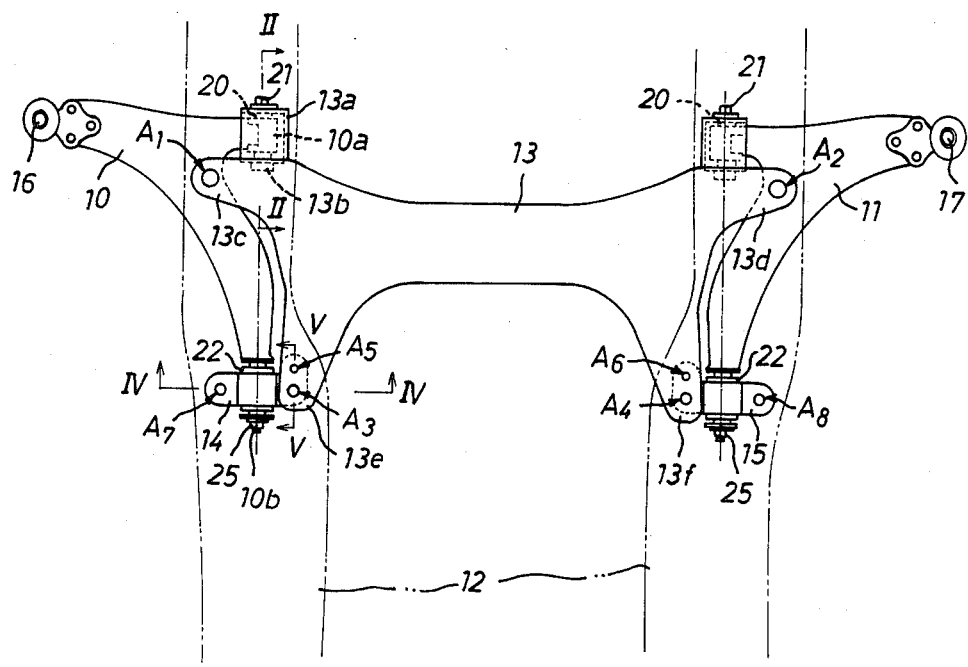
FIG. 1 is a schematic plan view of a subframe which is fastened to the vehicle chassis with a pair of suspension arms articulated thereto in accordance with the present invention.

Referring now to FIG. 1 of the drawings, there is illustrated a front wheel suspension for a motor vehicle which includes a pair of suspension arms 10 and 11 arranged symmetrically with respect to the center line of the vehicle, and a subframe 13 arranged transversely to the longitudinal direction of the vehicle and fastened removably to a pair of parallel body frames 12 of the vehicle chassis. The left-hand suspension arm 10 is formed with a base portion having a front end 10a articulated to a left-hand front end 13a of the subframe 13 and a rear end 10b rotatably supported by a bracket 14 which has a base portion fastened to a left-hand rear end 13e of the subframe 13 and an end portion fastened to the left-hand body frame 12 of the vehicle chassis. Similarly, the right-hand suspension arm 11 is formed with a base portion having a front end articulated to a right-hand front end of the subframe 13 and a rear end rotatably supported by a bracket 15 which has a base portion fastened to a right-hand rear end 13f of the subframe 13 and an end portion fastened to the right-hand body frame 12 of the vehicle chassis.

Figure 2:
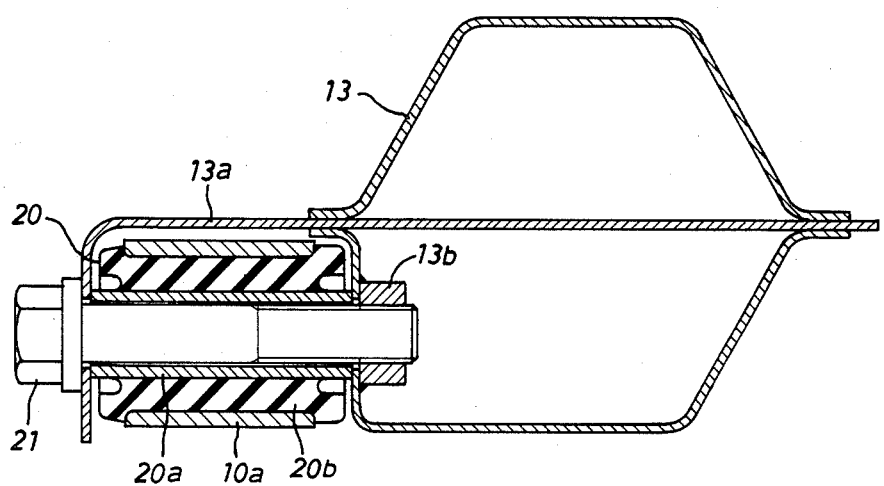
FIG. 2 is an enlarged sectional view taken along the line II—II in FIG. 1.

Hereinafter, a mounting construction of the left-hand suspension arm 10 will be described in detail because it is substantially the same as that of the right-hand suspension arm 11. As shown in FIGS. 1 and 2, the front end base portion 10a of suspension arm 10 is in the form of a bearing eyelet into which is inserted a rubber-metal bearing 20 including a metal bushing 20a and a resilient element 20b of synthetic rubber secured to the metal bushing 20a and fixedly coupled within the eyelet with a press fit. The subframe 13 is integrally provided at its left-hand front end 13a with an arm of L-letter shaped cross-section and is provided in its left-hand front end portion with a nut 13b welded to an internal wall of the subframe 13. In a condition where the rubber-metal bearing 20 is coupled with the left-hand front end 13a of subframe 13, a fastening bolt 21 is inserted into the metal bushing 21a of bearing 20 and threaded into the nut 13b to articulate the front end base portion 10a of suspension arm 10 to the subframe 13.

Figure 3:
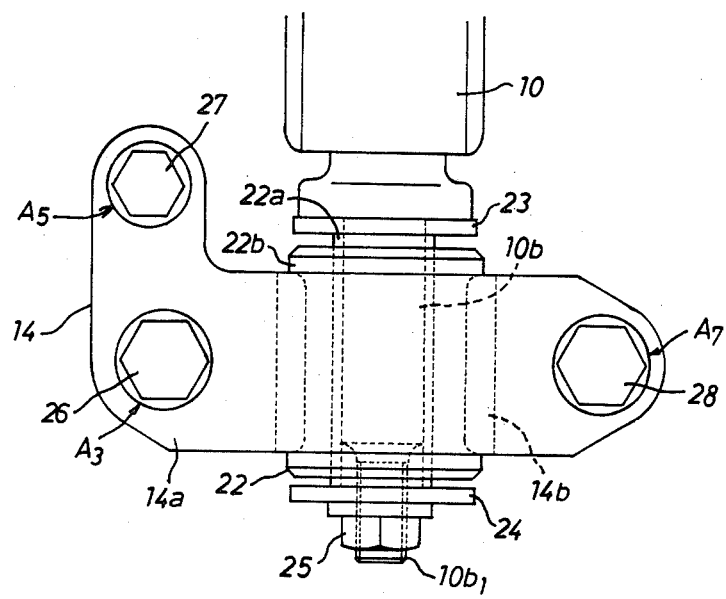
FIG. 3 is an enlarged bottom view of a left-hand bracket shown in FIG. 1.
Figure 4:
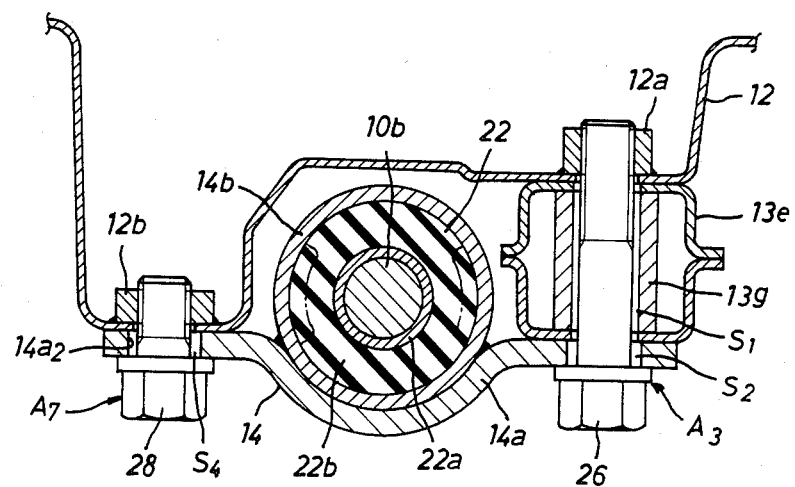
FIG. 4 is an enlarged sectional view taken along the line IV—IV in FIG. 1.

As shown in FIGS. 1, 3 and 4, the rear end base portion 10b of suspension arm 10 is in the form of a rod which is inserted into a metal bushing 22a of a rubber-metal bearing 22. The rubber-metal bearing 22 includes a resilient element 22b of synthetic rubber secured to the metal bushing 22a and fixedly coupled within a sleeve 14b which is welded to the bracket 14. During mounting process of the suspension arm 10, the rod 10b of suspension arm 10 is inserted into the metal bushing 22a through an annular retainer 23 and fastened to the metal sleeve 22a through an annular retainer 24 by means of a nut 25 threaded over an outer end $10b_1$ of rod 10b.

Figure 5:
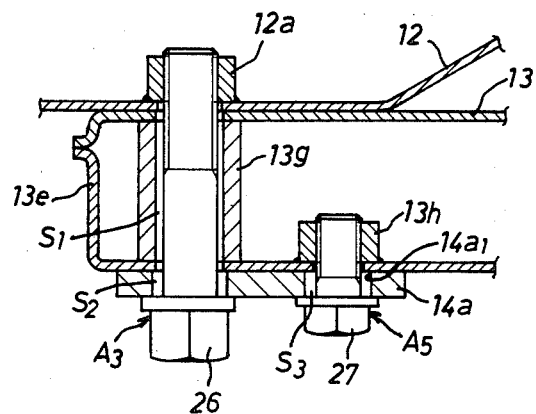
FIG. 5 is an enlarged sectional view taken along the line V—V in FIG. 1.

As shown in FIGS. 1, 4 and 5, the subframe 13 has a pair of laterally spaced front end portions 13c and 13d which are fastened to the body frames 12 by means of fastening means $A_1$ and $A_2$ in such a manner as to be adjustable in position. The subframe 13 has the pair of laterally spaced rear end portions 13e and 13f which are fastened to the body frames 12 together with brackets 14, 15 by means of fastening means $A_3$ and $A_4$ in such a manner as to be adjustable in position. The front end portions 13c, 13d and rear end portions 13e, 13f of subframe 13 are each reinforced by such a vertical sleeve 13g as shown in FIGS. 4 and 5. The fastening means $A_1$, $A_2$ and $A_4$ each are substantially the same as the fastening means $A_3$ which comprises a nut 12a welded to an internal wall of the under body frame 12, and a fastening bolt 26 threaded into the nut 12a through the vertical sleeve 13g as shown in FIGS. 4 and 5. For adjustment of the subframe 13 relative to the body frame 12, there are provided an annular clearance $S_1$ between the vertical sleeve 13g and fastening bolt 26 and an annular clearance $S_2$ between the bracket 14 and fastening bolt 26.

Figure 6:
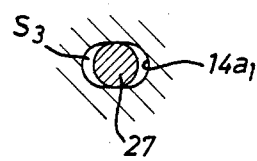
FIG. 6 illustrates a cross-section of a fastening bolt shown in FIG. 5.

As shown in FIGS. 3-5, the bracket 14 is in the form of an L-letter shaped base plate 14a which is provided with the sleeve 14b welded to an intermediate portion thereof. The bracket 14 is preliminarily fastened at its base portion to the subframe 13 by means of fastening means $A_5$ in such a manner as to be adjustable in position and fastened to the body frame 12 through the subframe 13 by means of the fastening means $A_3$. The bracket 14 is fastened at its end portion to the body frame 12 by means of fastening means $A_7$. As shown in FIGS. 5 and 6, the fastening means $A_5$ includes a nut 13h welded to an internal wall of subframe 13, and a fastening bolt 27 threaded into the nut 13h through an elongated bore $14a_1$ in bracket 14. For adjustment of the bracket 14 relative to the subframe 13, there is provided an annular clearance $S_3$ between the bracket 14 and fastening bolt 27. As shown in FIG. 4, the fastening means $A_7$ includes a nut 12b welded to an internal wall of the body frame 12, and a fastening bolt 28 threaded into the nut 12b through a bore $14a_2$ in bracket 14. For adjustment of the bracket 14 relative to the body frame 12, there is provided an annular clearance $S_4$ between the bracket 14 and fastening bolt 28. In addition, fastening means $A_6$ and $A_8$ for the right-hand bracket 15 each are substantially the same as the fastening means $A_5$ and $A_7$.

During assembly process of the front wheel suspension, the brackets 14, 15 are connected to each rear end base portion of the suspension arms 10, 11 through the rubber-metal bearings 22, and the suspension arms 10, 11 are each connected at their front end base portions to the laterally spaced front ends of subframe 13 by means of the fastening bolts 21 through the rubber-metal bearings 20. Subsequently, the brackets 14, 15 are each fastened at their base portions to the laterally spaced rear end portions 13, 13f of subframe 13 by means of the fastening means $A_5$, $A_6$. Thus, the suspension arms 10, 11, subframe 13 and brackets 14, 15 are assembled as an integral unit. Thereafter, the subframe 13 is fastened at its front end portions 13c, 13d to the body frames 12 by means of the fastening means $A_1$, $A_2$ and fastened at its rear end portions 13e, 13f to the body frames 12 through the brackets 14, 15 by means of the fastening means $A_3$, $A_4$. Finally, the brackets 14, 15 are each fastened at their end portions to the body frames 12 by means of the fastening means $A_7$, $A_8$. During the assembly process described above, it is able to adjust each position of the suspension arms 10, 11 relative to the subframe 13, and it is also able to adjust each position of the subframe 13 and brackets 14, 15 relative to the body frames 12.

As will be understood from the above description, the front wheel suspension is characterized in that the suspension arms 10, 11 are each articulated at their front and rear end base portions to the subframe 13 and to the brackets 14, 15 which are fastened to the subframe 13 by means of the fastening means $A_5$, $A_6$. In such a mounting construction, precision in position of the suspension arms 10, 11 is influenced only by precision in fabrication of the subframe 13. For this reason, the suspension arms 10, 11 can be precisely positioned in place in a simple manner. This serves to ensure precise alignment of the wheel suspension. Furthermore, the front wheel suspension is characterized in that the brackets 14, 15 are each fastened at their base portions to the body frames 12 through the subframe 13 by means of the fastening means $A_3$, $A_4$ and fastened at their end portions to the body frames 12 by means of the fastening means $A_7$, $A_8$. This is useful to enhance support rigidity of the subframe 13 and also useful to disperse the load acting on the body frames 12 from the suspension arms 10, 11. For this reason, it is able to ensure sufficient support rigidity of the suspension arms 10, 11 in a simple and light weight construction at a low cost.

In addition, the arrangement of the brackets 14, 15 is useful to provide the subframe 13 in a small size and light weight construction, and the sleeves 14b integral with the respective brackets 14, 15 are useful to assemble the respective rubber-metal bearings 22 in place without causing undesired irregular interference of the rubber elements 22b. In the case that the rubber element 22b is formed in its outer periphery with a pair of semicircular recesses as shown by imaginary lines in FIG. 4, the characteristic of rubber element 22b can be adjusted in an appropriate value.

Although a preferred embodiment of the present invention has been shown and described above, it is obvious that many modifications and variations thereof are possible in light of these teachings. It is to be understood, therefore, that within the scope of the appended claims, the invention may be practiced otherwise than as specifically described herein.

What is claimed is:

1. In a wheel suspension for a motor vehicle comprising a subframe arranged transversely to the longitudinal direction of the vehicle and having a pair of laterally spaced front end portions to be fastened to the vehicle chassis and a pair of laterally spaced rear end portions to be fastened to the vehicle chassis, and a pair of suspension arms each base portion of which has a front end articulated to the respective front end portions of said subframe and a rear end to be articulated to the respective rear end portions of said subframe, the improvement wherein a pair of brackets each are fastened at their base portions to the rear end portions of said subframe to support each rear end base portion of said suspension arms articulated thereto, and wherein said brackets each are further fastened at their base portions to the vehicle chassis through the rear end portions of said subframe and at their end portions to the vehicle chassis.

2. A wheel suspension as recited in claim 1, wherein said brackets each are in the form of an L-letter shaped base plate fastened at its base portion to said subframe to reinforce each rear end portion of said subframe.

3. A wheel suspensioon as recited in claim 1, wherein said brackets each are integrally provided thereon with a sleeve, and each rear end base portion of said suspension arms is supported by a rubber-metal bearing including a metal bushing and a rubber element secured to said metal bushing and coupled within said sleeve.

* * * * *